Figure 1:
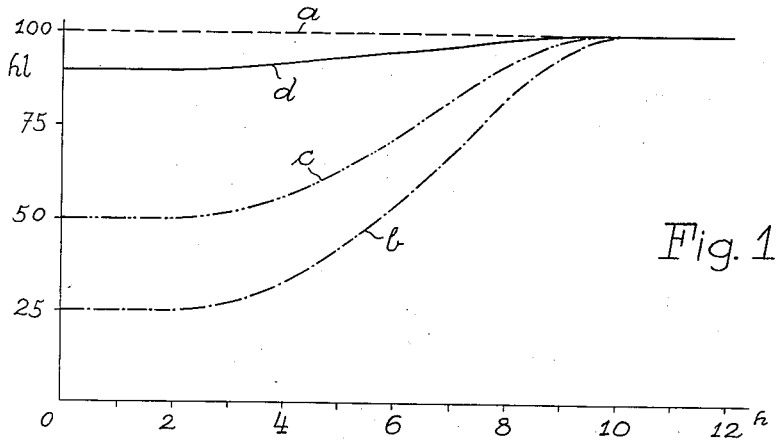

May 7, 1940.  G. DE BECZE  2,199,722
MANUFACTURE OF YEAST
Filed Jan. 25, 1939  2 Sheets-Sheet 1

Inventor
George de Becze
By [signature]
Atty.

Inventor
George de Becze

Patented May 7, 1940

2,199,722

UNITED STATES PATENT OFFICE 2,199,722

MANUFACTURE OF YEAST

George de Becze, Lawrenceburg, Ind.

Application January 25, 1939, Serial No. 252,819
In Germany January 26, 1938

4 Claims. (Cl. 195—94)

This invention relates to improvements in the manufacture of yeast.

In the formerly practised method of manufacturing air-grown yeast known as "adjusting process" ("Einstellverfahren") the strongly diluted worts were pitched with relatively small quantities of yeast, and were then fermented under aeration. With this manner of working the sugar concentration decreases from the very beginning while the yeast concentration increases continually, according as the propagation of the yeast proceeds. When working on this method, the propagation of the yeast is started as a rule in a solution having an initial yeast concentration of about 1%, i. e. containing 1 kg. of pitch yeast to 1 hectoliter of solution; this concentration will rise to 3–4 per cent in the fermented solution. Owing to the known stimulating action of a high degree of dilution the yeast will soon begin to bud, and multiplication at first proceeds rapidly. Vessel space and aeration are well utilized from the very beginning. These favorable initial conditions are however bound to change very soon, the propagation slackens perceptibly towards the end of the first half of the fermentation time, and takes a more and more sluggish course. Neither is the utilization of the raw material satisfactory. On the other hand, the quality of the manufactured yeast will be nearly as good as the best distillery yeast. This outstanding quality of the yeast may be brought into connection with the fact that the yeast was obtained from a solution wherein the yeast concentration has risen to material height owing to the fact that the volume of the solution had remained the same all the time.

The so-called "continuous addition process" employed in modern air-yeast industry is characterized by the feature that according as the sugar contained in the fermenting solution is being consumed by the growing yeast, fresh quantities of nutrient solution are added, continuously or intermittently. The volume of the solution increases thus continually, as a rule to at least twice its initial amount. The quantity of pitch yeast employed amounts to about 2–2.5 kgs. to the hectoliter of starting solution; propagation as a rule is allowed to go as far as 3.5–4.5 times the initial yeast quantity. Accordingly if, for instance, the volume of the fermented solution amounts to about twice the initial volume, and the yeast has been propagated to about four times its initial quantity, the yeast concentration in the fermented solution will be approximately the double of the initial concentration.

Whereas, is is known, in the continuous addition process the optimum concentration and feeding conditions are maintained during the entire course of fermentation, in the so-called "adjusting process" favorable conditions do prevail but at the beginning of fermentation though then, indeed, they are particularly advantageous. Also the product of this process, as told before, is of a very good quality. On the other hand, yields are materially larger with the continuous addition process.

The process according to the invention is a combination of the two working methods referred to above, which ensures all of their advantages without their inherent drawbacks. The new process is characterized by the following features:

(1) The fermentation is started in a body of solution amounting to 80–90 per cent of the volume which will be present after fermentation;

(2) The quantity of pitch yeast employed is such and the conditions of the propagation are so established that the yeast concentration in the fermented solution will amount to at least three times the yeast concentration of the starting solution;

(3) The additions are such as to correspond to the rate of natural growth in the first half of the fermentation time, while lagging behind it in the second half.

According to a preferred modification of the invention the fresh nutrient solution is added to the starting solution in the highest concentrated form in which it can be procured, the sugar concentration of the starting solution amounting to less than 1%, preferably only to about 0.25–0.50%. If now this starting solution is pitched with seed yeast at a similar rate with respect to the sugar content as it is customary in the continuous addition process, this yeast quantity will be distributed on a comparatively large volume, i. e. the yeast concentration of the starting solution will be a low one. Accordingly, after a short incubation period, budding sets in rapidly, the well distributed yeast cells are easily impinged upon by the air bubbles, the utilization of the air and also of the vessel space is thus favorable from the very beginning, and propagation will proceed rapidly. The drawbacks which under similar conditions had soon manifested themselves in the "adjusting process" (premature slackening of the propagation, etc.) are not experienced since the starting solution only contains part of the sugar quantity which is to be worked up; the rest of the sugar will be supplied to the yeast which at first is propagating rapidly by and by, according as additions are made.

In effecting, in accordance with the invention, the sugar supply in such a manner that in the second half of the fermentation period it will lag behind the rate that would correspond to natural propagation, and the volume of the solution will but insignificantly increase, the principle on which the continuous addition process is based, namely the substantial maintenance of constant concentration and feeding conditions during the entire course of fermentation, has partly been relinquished. Accordingly the propagation curve of the yeast will distinctly differ from the known curve of Prof. Euler; it will arrive to an inflexion point sooner while starting much more steeply. That means a shortened fermentation period or, if the fermentation time be the same, a prolongation of the main propagation stage so that the nutrients will be utilized more efficiently, i. e. the yield will be increased. Thus in the process according to the invention the yeast concentration with which the normal continuous addition process is begun, is only attained at an advanced stage of the multiplication, the yeast, until the obtention of this concentration value, being propagated under much more favorable conditions than in the continuous addition process, namely very rapidly, and with a far-going utilization of the nutrients.

The accompanying figures were obtained in the course of practical experiments which, for the sake of comparison, had been performed on equal conditions. Accordingly the fermentation times, the quantities of pitch yeast employed, the quantities of sugar (molasses) treated, the nutrient salts added, and the solution volumina present after the fermentation were the same in each case.

Figure 2:
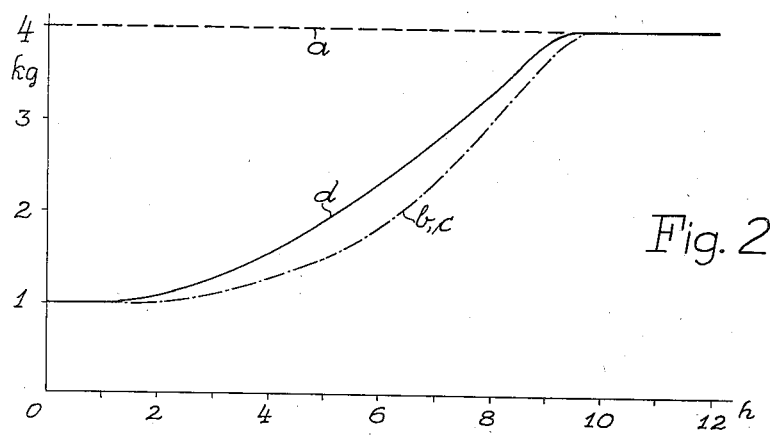
Figure 3:
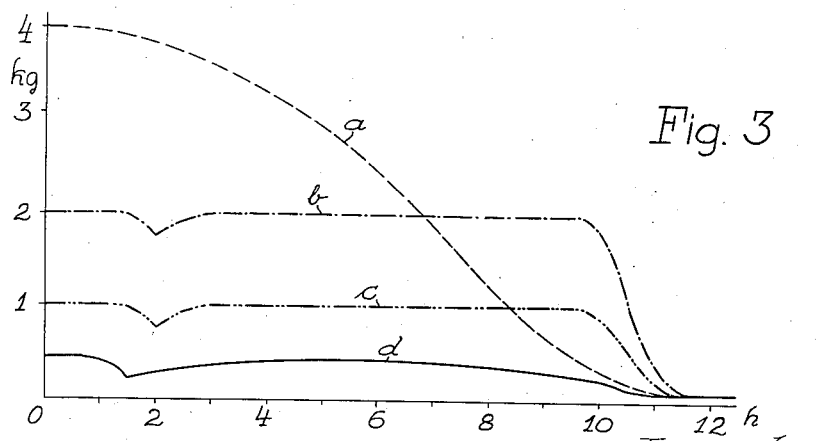
Figure 4:
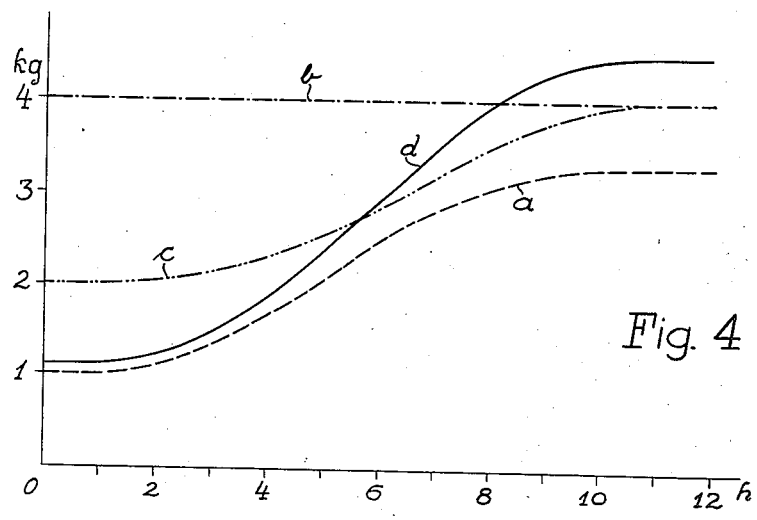
Figure 5:
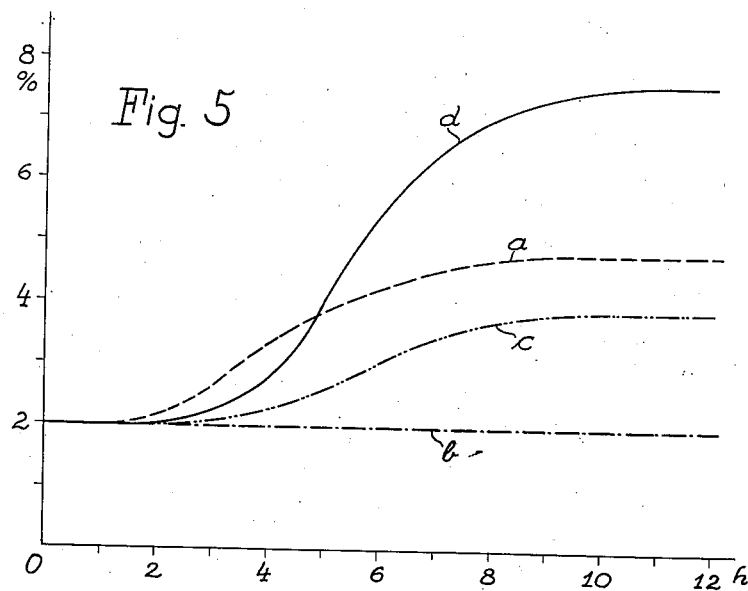

According to Figure 1 the final volumes, i. e. those of the fermented solutions amount to 100 hectoliters while the starting volumes are different. Fig. 2 gives the total amount of fermented molasses in kilograms, calculated on 100 liters of the fermented solution. Fig. 3 shows the amount, expressed in kilograms, of unfermented molasses present at any time in 100 liters of the fermenting solution, i. e. the actual molasses or sugar concentration; Fig. 4 gives the actual yeast concentration on a similar base. Figure 5 shows the increase of the yeast concentration in a solution having an initial yeast concentration of 2%, with particular reference to the conditions ruling in Example 2.

The experimental results as shown by the curves $a$ were obtained by working according to the "adjusting process", the curves $d$ represent the results of working in accordance with the invention. The curves $b$ refer to the extreme case of carrying the continuous addition process into effect with full maintenance of its ideal principle, i. e. retaining the sugar and yeast concentration at constant values during the entire course of fermentation. The curves $c$ represent the results of that other extreme case when the volume of the solution, with a constant sugar concentration, is doubled in the end.

According to Figure 1, $a$ is a straight line running parallel to the abscissa of the time, the volume of the starting solution being the same as that of the fermented solution. Also Fig. 2 shows a straight line $a$ parallel to the abscissa of the time, the starting solution containing here already the total amount of molasses, in the present case 4 kgs. to 100 liters of the starting solution. According to the curves $b$, $c$ and $d$ the total amount of molasses equally amounts to 4 kgs., but with reference to 100 liters of the fermented solution. According to curve $a$ of the Figure 3 the molasses concentration is sinking at an increasing rate after the first four hours of fermentation. According to the process of the invention (curve $d$) the decrease of the sugar concentration begins in the sixth hour, but slowly and evenly. Although the absolute amount of molasses is the same in both cases, the starting point of curve $d$, owing to the degree of dilution which is about twice as high as in case of the curve $a$, lies only half as high as the starting point of the latter.

According to curve $a$ of Figure 4 the yeast concentration in the fermented solution amounts to 3.4%. The yeast concentration of the starting solution according to curve $c$ amounts to 2% with the same amount of yeast as in case of curve $a$, and is increased to 4% in the fermented solution. According to curve $b$ the yeast concentration of the starting solution amounting to 4% remains constant. According to curve $d$ the initial yeast concentration, as a result of the strong dilution of the starting solution which otherwise contains an equal amount of yeast, does not amount to more than 1.1% but rises to a value of 4.5% in the fermented solution.

As may be seen from Figure 4, in the first hours the curve $d$ runs parallel with the curve $a$. Approximately from the fourth hour onwards the increase in steepness of the curve $a$ begins however to lag behind that of the curve $d$. The ascent of curve $c$ too is surpassed in rapidity and steepness by the curve $d$ since according to the invention the propagation sets in earlier and at first is proceeding faster than in the continuous addition process. It is true that since in the second half of the fermentation period less than the required quantity of sugar is introduced the curve $d$ will flatten sooner than the curve $c$. However as the utilization of the nutrients has gone to a very far extent in the first half of the fermentation period, the yield of yeast will be higher in the end than in case $c$. According to Figure 5 the yeast concentration amounts to 2% in each of the starting solutions; to obtain this result, the starting solutions of different volume must be seeded with corresponding, i. e. with different quantities of pitch yeast. In the case of the curve $d$ for instance, where the volume of the starting solution is about twice as large as in case $c$, about twice as large a quantity of pitch yeast has to be applied. If the pitch yeast is allowed to propagate to four times its initial volume in both cases, the yeast concentration will be doubled, i. e. it will rise to 4% in the case $c$ whereas it will attain four times its initial value, i. e. 8% in the case $d$.

The experiments, the results of which are illustrated in the figures, have shown that the quality, and more particularly the rising power of a yeast obtained from a fermented solution with a higher yeast concentration is superior to that of a yeast obtained in the normal continuous addition process in the same quantity, but out of a fermented solution less concentrated in yeast.

*Example 1.*—9000 liters of a solution containing 50 kgs. of molasses, 4 kgs. of diammonium phosphate, and 4 kgs. of ammonium sulphate were introduced into a fermenter holding about 130 hectoliters and equipped for aeration. The solution was pitched with 100 kgs. of seed yeast. By the addition of dilute sulphuric acid the solution was brought to a pH-value amounting to 5, the temperature was adjusted to 28–30° C., and the aeration begun. In the further course of working the pH-value was kept between 4.5 and 5.5 by adding ammonia. For the additions an aqueous solution of 1000 liters, containing 350 kgs. of molasses, 6 kgs. of diammonium phosphate, and 8 kgs. of ammonium sulphate was prepared in a separate vessel. After about 1½ hours the addition was begun with, successive rations of 60, 75, 95, 130, 150, 160, 170 and 160 liters being added at one hour intervals respectively. The solution was allowed to after-ferment for 2½ hours, and thereafter, i. e. after a total fermentation period of 12 hours the yeast was separated from the fermented solution amounting to 10,000 liters. The quantity of yeast separated off amounted to 450 kgs. Thus there were obtained from 400 kgs. of molasses (allowance being made for the pitch yeast) 350 kgs. of yeast, which corresponds to a yield of 87.5%.

For the sake of comparison the same quantity, i. e. 400 kgs. of molasses were treated according to the continuous addition process of curve c, the fermentation being equally continued for 12 hours. From the fermented solution which amounted equally to 10,000 liters 402 kgs. of yeast could be separated. Thus the growth of the yeast, calculated on the molasses worked up, amounted to 302 kgs. which corresponds to a yield of 75.5%.

Another experimental fermentation was carried out in accordance with the old process of curve a. Again 10,000 liters of a solution containing 400 kgs. of molasses were pitched with 100 kgs. of yeast. After 12 hours of fermentation 330 kgs. of yeast were obtained; accordingly the yield of yeast, calculated on the molasses worked up, amounted to 57.5%.

Example 2.—8500 liters of a solution containing 100 kgs. of molasses, 8 kgs. of diammonium phosphate and 8 kgs. of ammonium sulphate were introduced into a fermenting vat as in Example 1. After having pitched the solution with 200 kgs. of seed yeast, fermentation was started under the same conditions as in Example 1. The solution to be added was prepared in a separate vat, it contained to a volume of 1500 liters 700 kgs. of molasses, 12 kgs. of diammonium phosphate and 16 kgs. of ammonium sulphate. After 90 minutes this concentrated solution was added to the fermenting solution in successive rations of 92, 113, 144, 186, 225, 240, 260, 240 liters respectively, at one hour intervals. The quantity of yeast separated off after an after-fermentation of 2½ hours, i. e. after a total fermentation period of 12 hours, amounted to 794 kgs. There had thus been obtained from the 800 kgs. of molasses 794—200=594 kgs. of yeast, representing a yield of 74.2%. The yeast obtained was well balanced, and showed very good properties. Its rising power surpassed that of the otherwise very good yeast obtained according to Example 1 by about 25%.

Molasses solutions of the concentrations given in the examples or even higher concentrated ones are easily obtained by means of the molasses separator. Besides worts of a similarly high sugar concentration may also be prepared of corn, for instance.

I claim:

1. An improved method of carrying out an addition process of manufacturing yeast which comprises starting the propagation of the yeast under aeration in a highly diluted nutrient solution containing yeast assimilable sugar and also nutrient salts and having a volume which amounts to 80–90 per cent of the volume of solution that will be present at the end of the fermentation, and controlling the propagation by appropriate adjustment of the quantities of seed yeast employed, of the additions of sugar and nutrient salts made, and of the rate of aeration in such a manner that the quantity of yeast obtained in the fermented solution per unit of volume will be at least three times so large as it had been in the starting solution, the additions of fresh nutrient solution containing yeast assimilable sugar and also nutrient salts made to the fermenting solution corresponding in the first half of the fermentation period to the rate of natural yeast growth while lagging behind that rate in the second half.

2. A method as claimed in claim 1 in which the fresh nutrient solution containing yeast assimilable sugar and nutrient salts which is added to the fermenting solution has a sugar concentration of about 15–25 per cent.

3. An improved method of carrying out an addition process of manufacturing yeast which comprises starting the propagation of the yeast under aeration in a highly diluted sugar solution containing about 0.25–0.75 per cent of yeast assimilable sugar, said solution containing also nutrient salts and having a volume amounting to 80–90 per cent of the volume of solution that will be present at the end of the fermentation, pitching said solution with about 1–2 kgs. of seed yeast to the hectoliter of solution, and controlling the propagation by appropriate adjustment of the additions of sugar and nutrient salts made, and of the rate of aeration in such a manner that the quantity of yeast obtained in the fermented solution per unit of volume will be at least three times so large as it had been in the starting solution, the additions of fresh nutrient solution containing yeast assimilable sugar and nutrient salts made to the fermenting solution corresponding in the first half of the fermentation period to the rate of natural yeast growth while lagging behind that rate in the second half.

4. A method as claimed in claim 3 in which the fresh nutrient solution containing yeast assimilable sugar and nutrient salts which is added to the fermenting solution has a sugar concentration of about 15–25 per cent.

GEORGE DE BECZE.